(12) United States Patent
Vemuri et al.

(10) Patent No.: US 11,375,386 B2
(45) Date of Patent: Jun. 28, 2022

(54) METHOD AND SYSTEM FOR BEAMFORM MANAGEMENT IN VEHICULAR COMMUNICATIONS

(71) Applicant: GM GLOBAL TECHNOLOGY OPERATIONS LLC, Detroit, MI (US)

(72) Inventors: Venkata Naga Siva Vikas Vemuri, Novi, MI (US); Andrew J. MacDonald, Grosse Pointe Park, MI (US); Scott T Droste, West Bloomfield, MI (US); Ashhad Mohammed, Farmington Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 17/005,463

(22) Filed: Aug. 28, 2020

(65) Prior Publication Data

US 2022/0070686 A1 Mar. 3, 2022

(51) Int. Cl.
*H04W 16/28* (2009.01)
*H04W 36/00* (2009.01)
*H04W 36/32* (2009.01)

(52) U.S. Cl.
CPC ....... *H04W 16/28* (2013.01); *H04W 36/0058* (2018.08); *H04W 36/32* (2013.01)

(58) Field of Classification Search
CPC ... H04B 7/0617; H04B 17/318; H04W 48/20; H04W 36/08; H04W 36/0058; H04W 36/32; H04W 48/04; H04W 16/28; H01Q 1/3275
See application file for complete search history.

(56) References Cited

U.S. PATENT DOCUMENTS

| | | | | |
|---|---|---|---|---|
| 2007/0146162 A1* | 6/2007 | Tengler | ................ | G08G 1/0962 340/905 |
| 2020/0413267 A1* | 12/2020 | Xue | ....................... | B64C 39/024 |
| 2021/0066780 A1* | 3/2021 | Fleischer | ............... | H01Q 1/246 |

FOREIGN PATENT DOCUMENTS

EP  1553789 A2 *  7/2005  ........... G01S 5/0284

* cited by examiner

*Primary Examiner* — Quoc Thai N Vuz
(74) *Attorney, Agent, or Firm* — Quinn IP Law (57) ABSTRACT

A method for beamform management in vehicular communications includes, within a computerized processor, determining a planned route for a vehicle, identifying a plurality of candidate cellular towers with which the vehicle may communicate along the planned route, and determining signal strengths of each of the towers at locations along the route. The method further includes determining a communication plan including identifying locations of each of the towers and segmenting the planned route into portions based upon the determined signal strengths. One of the towers is assigned to communicate with the vehicle for each of the portions based upon the signal strengths. The method further includes utilizing the communication plan to change communication between the vehicle and the towers as the vehicle traverses the route by directing a primary lobe of an antenna beam toward each of the candidate cellular towers in turn according to the communication plan.

15 Claims, 7 Drawing Sheets

METHOD AND SYSTEM FOR BEAMFORM MANAGEMENT IN VEHICULAR COMMUNICATIONS

INTRODUCTION

The disclosure generally relates to a method and system for beamform management in vehicular communications.

Cellular communications utilize different protocols depending upon evolving technology. Different wavelengths and corresponding frequencies of transmissions may be used with cellular devices. Different wavelengths of transmissions have different behaviors and requirements. An operation such as establishing communication between a piece of user equipment (UE) and a cellular tower may be relatively simple for one wavelength of transmission, while the same task may be relatively difficult for another wavelength of transmission.

Cellular devices utilizing transmission with a frequency of 6 GHz or less (with a corresponding wavelength of 50 millimeters or greater) typically have no problem establishing or switching communications from one cellular tower to another. For example, a vehicle utilizing cellular communications while driving along a road surface according to established processes may nearly seamlessly communicate with a series of cellular towers along the road surface, switching use of the various cellular towers based upon relative positions of the cellular towers to the vehicle as the vehicle moves.

Cellular devices using a wavelength of transmission around one millimeter may have more difficulty establishing or switching communications from one cellular tower to another. According to one exemplary protocol, such equipment may operate with transmissions in a one millimeter to 10 millimeter wavelengths. UE operating in this range of wavelengths have a relatively increased difficulty locking onto a communications signal from a particular cellular tower. As a result, for an exemplary vehicle traveling along a roadway, significant delays or interruptions in communications may be experienced as the vehicle is required to switch communication from one cellular tower to another cellular tower.

SUMMARY

A method for beamform management in vehicular communications is provided. The method includes, within a computerized processor, determining a planned route for a vehicle, identifying a plurality of candidate cellular towers with which the vehicle may communicate along the planned route, and determining signal strengths of each of the plurality of candidate cellular towers at locations along the planned route. The method further includes determining a communication plan including identifying geographic locations of each of the plurality of candidate cellular towers and segmenting the planned route into a plurality of portions based upon the determined signal strengths. One of the plurality of candidate cellular towers is assigned to communicate with the vehicle for each of the plurality of portions based upon the signal strengths. The method further includes utilizing the communication plan to change communication between the vehicle and the plurality of candidate cellular towers as the vehicle traverses the planned route. The utilizing includes directing a primary lobe of an antenna beam toward each of the candidate cellular towers in turn according to the communication plan.

In some embodiments, directing the primary lobe of the antenna beam toward each of the candidate cellular towers in turn according to the communication plan includes, when the vehicle transitions from one of the plurality of portions to a second of the plurality of portions, determining a current location of the vehicle and determining a current orientation of the vehicle. The method additionally includes determining an azimuth relative to the vehicle and an elevation relative to the vehicle for the candidate cellular tower assigned to communicate with the vehicle for the second of the plurality of portions based upon the geographic location of the candidate cellular tower assigned to communicate with the vehicle for the second of the plurality of portions, the current location of the vehicle, and the current orientation of the vehicle. The method additionally includes directing the primary lobe of the antenna beam toward the candidate cellular tower assigned to communicate with the vehicle for the second of the plurality of portions based on the azimuth relative to the vehicle and the elevation relative to the vehicle for the candidate cellular tower assigned to communicate with the vehicle for the second of the plurality of portions.

In some embodiments, determining the planned route for a vehicle includes monitoring an automated route programmed for the vehicle, wherein the vehicle operates as an autonomous vehicle.

In some embodiments, determining the planned route for a vehicle includes monitoring a user input planned route for the vehicle, wherein the vehicle operates as a manually operated vehicle.

In some embodiments, determining the planned route for a vehicle includes monitoring a user input planned destination for the vehicle and automatically estimating the planned route based upon the user input planned destination.

In some embodiments, the method further includes monitoring a detour event that changes the planned route, determining a new planned route based upon the detour event, and updating the communication plan based upon the new planned route.

In some embodiments, determining the communication plan includes utilizing a remote server device to create a beam matrix for each of the plurality of portions, the beam matrix including a list of the plurality of candidate cellular towers and the signal strengths of each of the plurality of candidate cellular towers. The method further includes transmitting the beam matrix to the vehicle.

In some embodiments, the method further includes monitoring a change to the planned route, utilizing the remote server device to create a new beam matrix based upon the change to the planned route, and transmitting the new beam matrix to the vehicle.

In some embodiments, the method further includes monitoring interruptions to the communication between the vehicle and one of the plurality of candidate cellular towers and utilizing the interruptions to modify future iterations of the communication plan.

In some embodiments, segmenting the planned route into the plurality of portions is further based upon reducing a total number of communication changes over the planned route.

According to one alternative embodiment, a method for beamform management in vehicular communications is provided. The method includes, within a computerized processor, determining a planned route for a vehicle, identifying a plurality of candidate cellular towers with which the vehicle may communicate along the planned route, and determining signal strengths of each of the candidate cellular towers at locations along the planned route. The method further includes determining a communication plan identifying geographic locations of each of the plurality of candidate cellular towers including segmenting the planned route into a plurality of portions based upon the determined signal strengths. The communication plan includes a list of the candidate cellular towers ranked according to the determined signal strengths for each of the plurality of portions. The method further includes utilizing the communication plan to change communication between the vehicle and the plurality of candidate cellular towers as the vehicle traverses the planned route. The utilizing includes directing the primary lobe of an antenna beam toward each of the candidate cellular towers in turn according to the communication plan.

In some embodiments, the method further includes, as the vehicle traverses one of the plurality of portions, monitoring an interruption in the communication between the vehicle and one of the plurality of candidate cellular towers, selecting a replacement cellular tower based upon the list of the candidate cellular towers, and directing the primary lobe of the antenna beam toward the replacement cellular towers.

In some embodiments, the method further includes tracking occurrences of the interruption in the communication between the vehicle and the one of the plurality of candidate cellular towers and utilizing the tracked occurrences to modify future iterations of the communication plan to avoid the interruption in the communication between the vehicle and the one of the plurality of candidate cellular towers.

In some embodiments, modifying future iterations of the communication plan includes utilizing a machine learning algorithm to discourage communication between the vehicle and the one of the plurality of candidate cellular towers.

According to one alternative embodiment, a system for beamform management in vehicular communications is provided. The system includes a vehicle and a computerized processor. The computerized processor is operable to determine a planned route for the vehicle, identify a plurality of candidate cellular towers with which the vehicle may communicate along the planned route, and determine signal strengths of each of the candidate cellular towers at locations along the planned route. The computerized processor is further operable to determine a communication plan including identifying geographic locations of each of the plurality of candidate cellular towers segmenting the planned route into a plurality of portions based upon the determined signal strengths. One of the candidate cellular towers is assigned to communicate with the vehicle for each of the plurality of portions. The computerized processor is further operable to utilize the communication plan to change communication between the vehicle and the plurality of candidate cellular towers as the vehicle traverses the planned route. Utilizing the communication plan includes determining a current location of the vehicle, determining a current orientation of the vehicle, and determining an azimuth relative to the vehicle and an elevation relative to the vehicle for one of the candidate cellular towers along the planned route based upon the current location of the vehicle, the current orientation of the vehicle, and the geographic location of the one of the candidate cellular towers. Utilizing the communication plan further includes directing a primary lobe of an antenna beam toward the one of the candidate cellular towers based on the azimuth and elevation for the one of the candidate cellular towers.

In some embodiments, the vehicle includes an autonomous vehicle. Determining the planned route for a vehicle includes monitoring an automated route programmed for the vehicle.

In some embodiments, the computerized processor is further operable to monitor a detour event that changes the planned route, determine a new planned route based upon the detour event, and update the communication plan based upon the new planned route.

In some embodiments, the system further includes a computerized remote server device operable to create a beam matrix for each of the plurality of portions, the beam matrix including a list of the plurality of candidate cellular towers and the signal strengths of each of the plurality of candidate cellular towers. The computerized remote server device is further operable to transmit the beam matrix to the vehicle.

In some embodiments, the computerized remote server device is further operable to monitor a change to the planned route, utilize the remote server device to create a new beam matrix based upon the change to the planned route, and transmit the new beam matrix to the vehicle.

The above features and advantages and other features and advantages of the present disclosure are readily apparent from the following detailed description of the best modes for carrying out the disclosure when taken in connection with the accompanying drawings.

DETAILED DESCRIPTION

A method and system for beamform management in vehicular communications is provided. A route of the vehicle is analyzed and correlated with provided cellular tower data. Based upon this data, a communications plan for the vehicle is determined, the communications plan including a schedule for the vehicle communicating with selected cellular towers along particular portions of the route. In one embodiment, a beam matrix may be provided to the vehicle including geographic locations of relevant cellular towers.

This geographic location data may be coupled with other information such as orientation of the vehicle to efficiently establish a communications connection or beamforming between the vehicle and a selected cellular tower.

In one embodiment, a UE within a vehicle may provide parameters such as route information, direction, location, velocity, and trajectory may be provided to a network element such as a remote server device, then, based on the data, the network will respond with a beam matrix describing signal strengths of various cellular towers near a planned designated route. This enables the UE to perform smart or improved selection of the communication beam or connection with a particular cellular tower. This further enables optimization of a communication beam after an initial acquisition.

In one embodiment, a beam matrix table contains geographical coordinates of the cellular towers, a next five best cells, best available beam in each cell, best alternative beams in order and geographical high density flag. If the high density flag is on, the network may send additional tables with best acquirable beams. Messaging may be reported on a PUSCH (Physical Uplink Shared Channel)/PUCCH (Physical Uplink Control Channel) or any other communication channel. The network may update the matrix in random intervals based on changing network conditions.

The disclosed methods save UE acquisition time or the time required for a UE to establish a communications link with a cellular tower. The disclosed methods further enable high gain during uplink communication, especially for autonomous vehicle applications. The disclosed methods enable reasonable or timely use of millimeter wave communications in high mobility application such as use in telematics or cellular devices traveling within a vehicle. The disclosed methods simplify beam acquisition, thereby saving antenna power.

If there is a detour or an abrupt route change, the vehicle may inform the network. An updated matrix may be provided based upon the new route.

In one embodiment, the beam is static. The directive gain of an antenna beam may be retained with the UE while transmitting data.

The disclosed methods may include informing the network element of the vehicle and/or UE's mobility parameters such as route information, velocity, direction, location and other mobility related information.

The disclosed methods may include the network element sending a beam index matrix table to the vehicle for decision making.

The disclosed methods may include the network element sending high density beam matrix tables to the vehicle in case of dense geographical conditions.

The disclosed methods may include informing the network about the vehicle detour information and reacquiring updated beam matrix tables.

Figure 1:
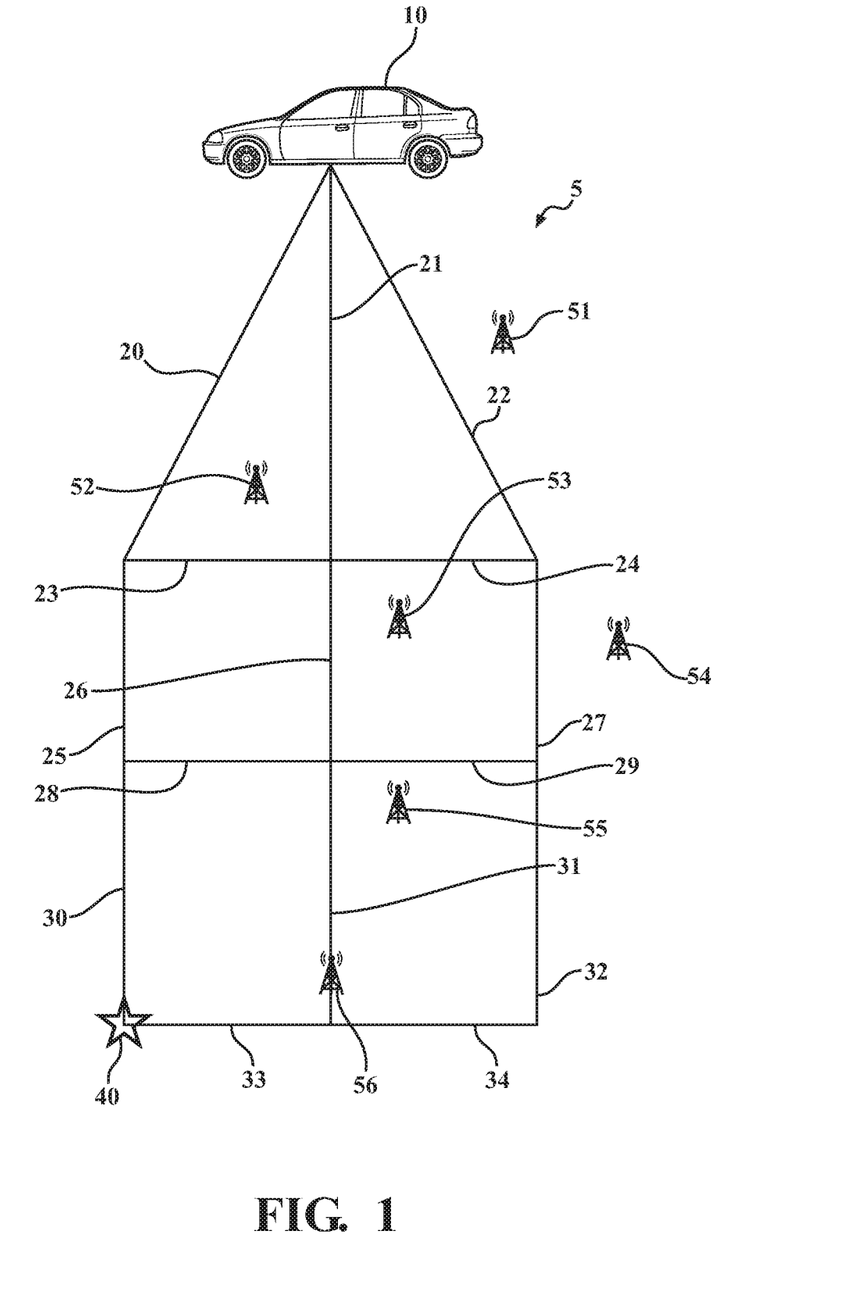
FIG. 1 schematically illustrates an exemplary vehicle upon a map including various roadways and cellular tower locations, in accordance with the present disclosure.

FIG. 1 schematically illustrates an exemplary vehicle 10 upon a map 5 including various roadways and cellular tower locations. The map 5 is illustrated including roadway 20, roadway 21, roadway 22, roadway 23, roadway 24, roadway 25, roadway 26, roadway 27, roadway 28, roadway 29, roadway 30, roadway 31, roadway 32, roadway 33, and roadway 34. The various roadways are provided as a network of paths or routes that the vehicle 10 could take to get from its current location to destination 40. Locations of a plurality of cellular towers are illustrated including cellular tower 51, cellular tower 52, cellular tower 53, cellular tower 54, cellular tower 55, and cellular tower 56.

The vehicle 10 is equipped with a UE embodied as a telematics device or a computerized device including a cellular communications module operable to transmit and receive data through a communications link to a cellular tower. The computerized device of the vehicle may include a user input and output device such as a touchscreen display, a map database, programming to determine a current location of the vehicle 10 based upon triangulation of cellular tower signals or other similar methods, and programming to receive as input from a user, estimate based upon historical driving patterns, or otherwise plot a planned route. The cellular communications module may be operable to communicate using transmissions approximately in a one millimeter to 10 millimeter wavelength band.

Each of the illustrated cellular towers is operable to communicate with UE devices such as cellular phones and vehicles including a vehicle equipped with a computerized device including a cellular communications module. The illustrated cellular towers may communicate with UE using transmission approximately in a one millimeter to 10 millimeter wavelength band.

Figure 2:
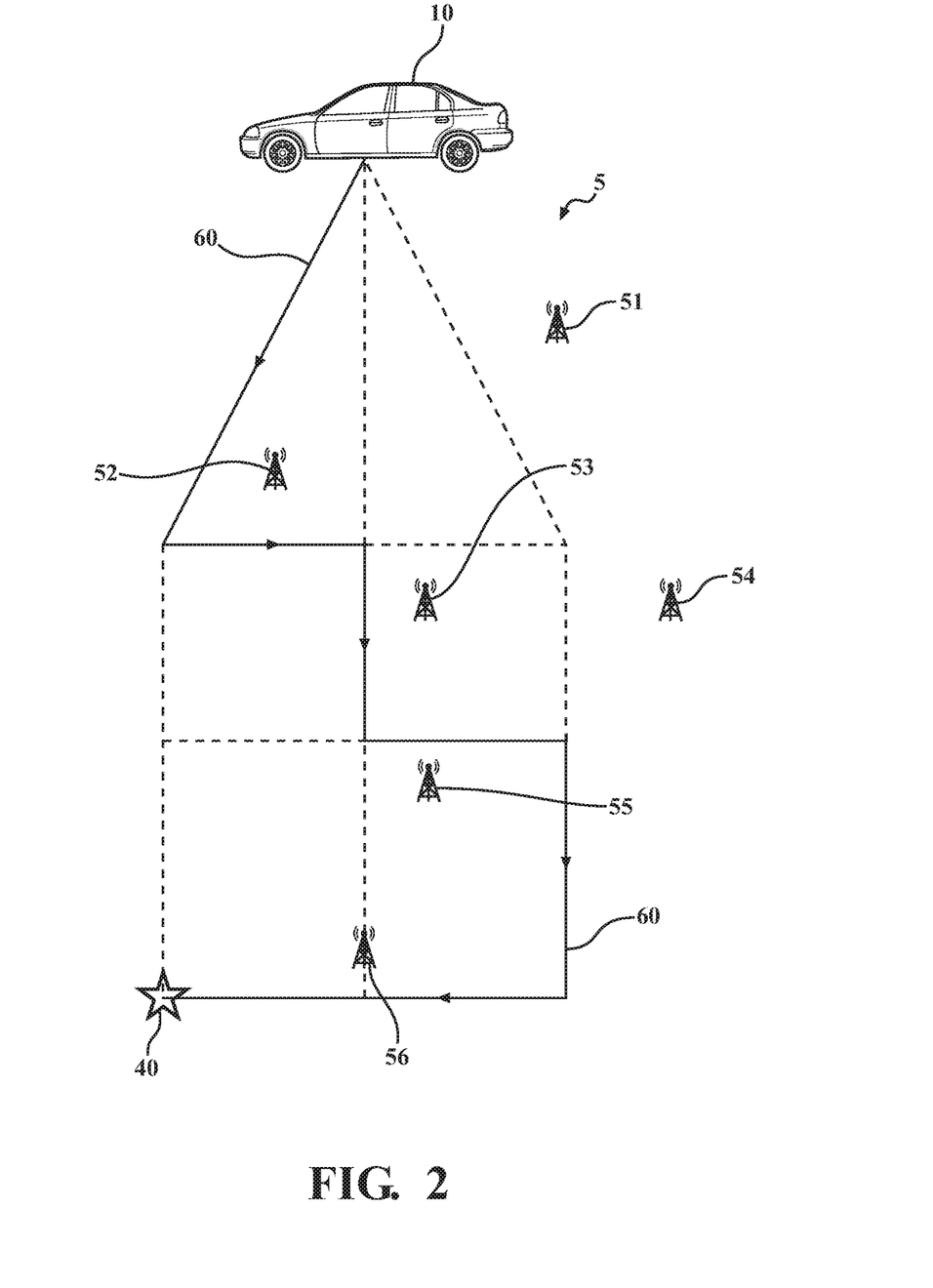
FIG. 2 illustrates the vehicle of FIG. 1 and additionally illustrates a route for the vehicle planned upon the map, in accordance with the present disclosure.

FIG. 2 illustrates the vehicle 10 upon map 5 of FIG. 1 and additionally illustrates a route 60 for the vehicle 10 planned upon the map 5. The map 5 is illustrated including the roadways of FIG. 1, illustrated with dotted lines. The route 60 is illustrated, including a selected subset of the roadways and the destination 40. Locations of the plurality of cellular towers of FIG. 1 are illustrated including the cellular tower 51, the cellular tower 52, the cellular tower 53, the cellular tower 54, the cellular tower 55, and the cellular tower 56. Along the route 60, the vehicle 10 will get closer and farther away from the various cellphone towers. The distances from each of the cellular towers will affect a strength of signal that the UE within the vehicle 10 will be able to establish with each cellular tower. Additionally, other factors such as topography, obstructions such as buildings, weather, and other similar factors may affect the signal strength of each cellular tower for the vehicle 10 at any given location on the map 5.

Figure 3:
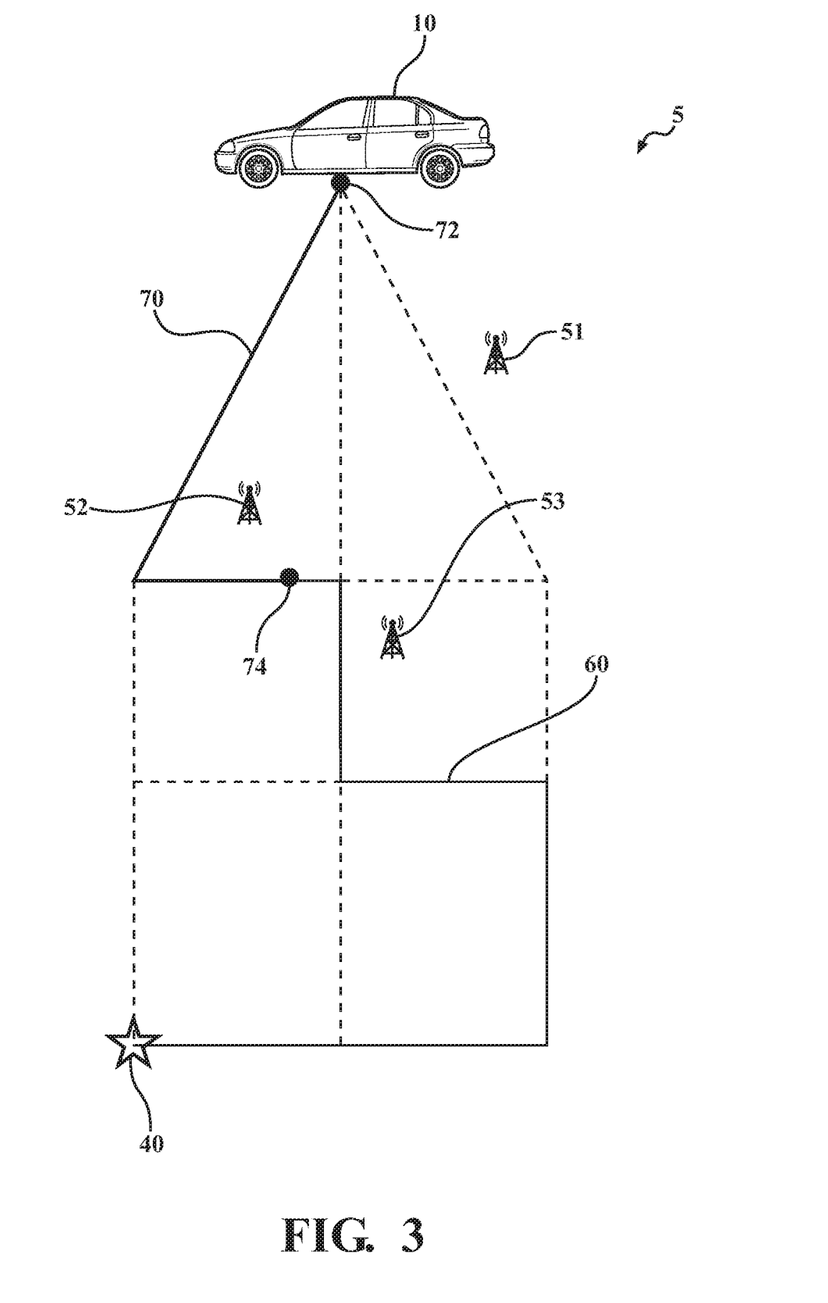
FIG. 3 illustrates the vehicle of FIG. 2, identifies a first portion of the route, and a corresponding selected cellular tower for the vehicle to communicate with along the first portion of the route, in accordance with the present disclosure.

A system and method are provided that plan communications for a vehicle along a planned route, using available information such as cellular tower locations and predicted signal strengths, to segment the route into portions of the route and assign a selected cellular tower for communication to each of the portions of the route. FIG. 3 illustrates the vehicle 10 upon the map 5 of FIG. 2, identifies a first portion 70 of the route, and a corresponding selected cellular tower 52 for the vehicle to communicate with along the first portion 70 of the route. The map 5 is illustrated including the roadways of FIG. 1, illustrated with dotted lines. The route 60 is illustrated, including a selected subset of the roadways and the destination 40. Locations of a portion of the plurality of cellular towers of FIG. 1 are illustrated including the cellular tower 51, the cellular tower 52, and the cellular tower 53. Based upon analysis of the route 60, estimated signal strength of the various cellular towers at points along the route 60, and other factors, the route 60 may be segmented into portions, with the first portion 70 being identified based upon the cellular tower 52 being identified as an acceptable cellular tower along the entirety of the first portion 70. A start point 72 of the first portion 70 may be identified as a current location of the vehicle 10 or as a start point of the route 60. While the cellular tower 51 may be closer to the vehicle 10 for some of the first portion 70, a determination may be made that the signal strength of the cellular tower 52 is adequate or acceptable throughout the first portion 70, and additionally, that the cellular tower 51 would have a superior signal strength to the cellular tower 52 only briefly. The cellular tower 52 may be selected in favor of the cellular tower 51 to avoid changing cellular towers too frequently. The analysis of the route 60, the cellular towers, and segmenting the route into portions may include balancing signal strengths of the various cellular towers at points along the route 60 with minimizing a number of changing cellular towers or minimizing a total number of portions into which the route 60 is divided. In one embodiment, a user may be given an option to prefer seeking the strongest signal whenever possible, an option to reduce an overall number of changes to cellphone towers through a route, or a balance of the two. An end point 74 of the first portion 70 may be selected based upon a point where a signal strength of an acceptable tower for a next segment of the route 60, in this example, of the cellular tower 53, becomes stronger than the signal strength of the cellular tower 52.

Figure 4:
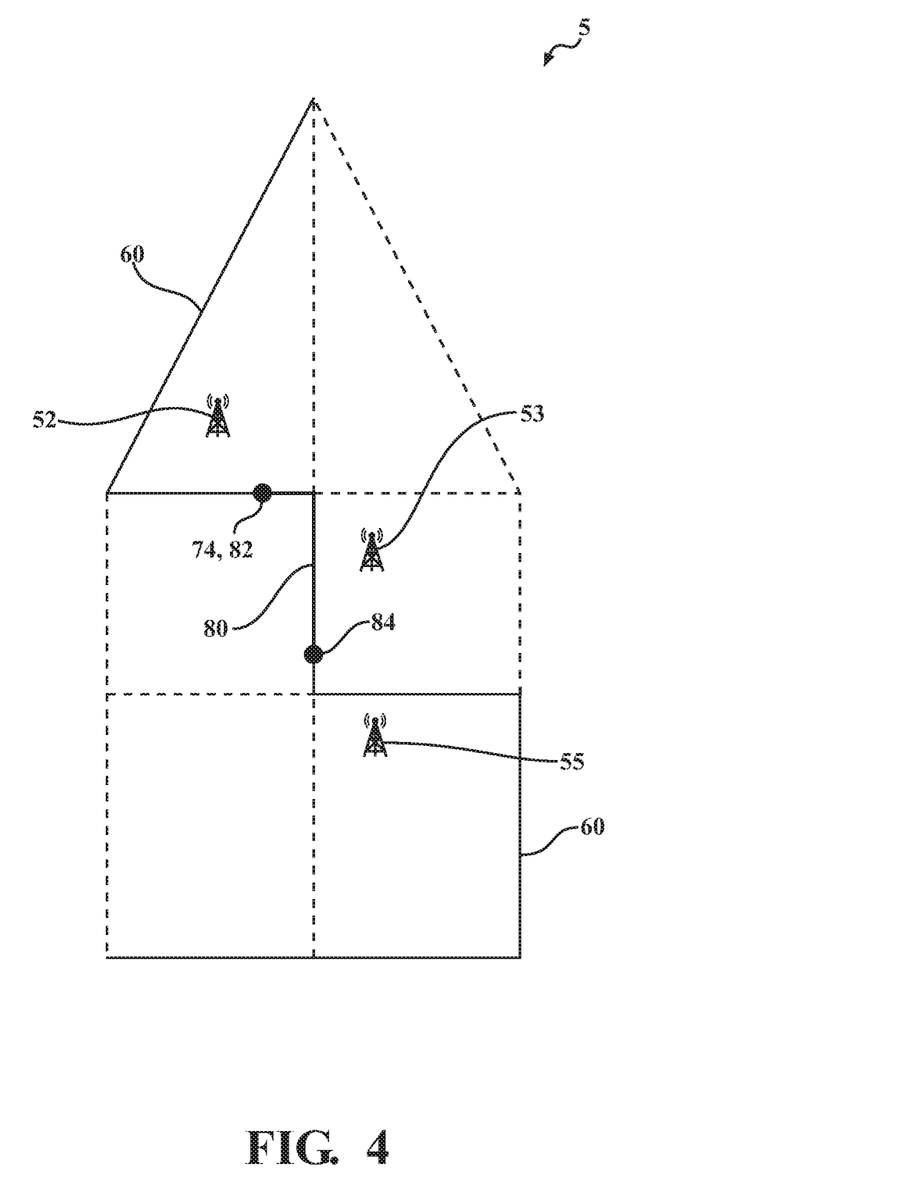
FIG. 4 illustrates the map of FIG. 2, identifies a second portion of the route, and a corresponding selected cellular tower for the vehicle to communicate with along the second portion of the route, in accordance with the present disclosure.

FIG. 4 illustrates the map 5 of FIG. 2, identifies a second portion 80 of the route 60, and a corresponding selected cellular tower 53 for the vehicle to communicate with along the second portion 80 of the route 60. The map 5 is illustrated including the roadways of FIG. 1, illustrated with dotted lines. The route 60 is illustrated, including a selected subset of the roadways. Locations of a portion of the plurality of cellular towers of FIG. 1 are illustrated including the cellular tower 52, the cellular tower 53, and the cellular tower 55. Based upon analysis of the route 60, estimated signal strength of the various cellular towers at points along the route 60, and other factors, the route 60 may be segmented into portions, with the second portion 80 being identified based upon the cellular tower 53 being identified as an acceptable cellular tower along the entirety of the second portion 80. A start point 82 of the second portion 80 may be identified as coincident to the end point 74 of the previous portion, the first portion 70 of FIG. 3. An end point 84 of the second portion 80 may be selected based upon a point where a signal strength of an acceptable tower for a next segment of the route 60, in this example, of the cellular tower 55, becomes stronger than the signal strength of the cellular tower 53.

Figure 5:
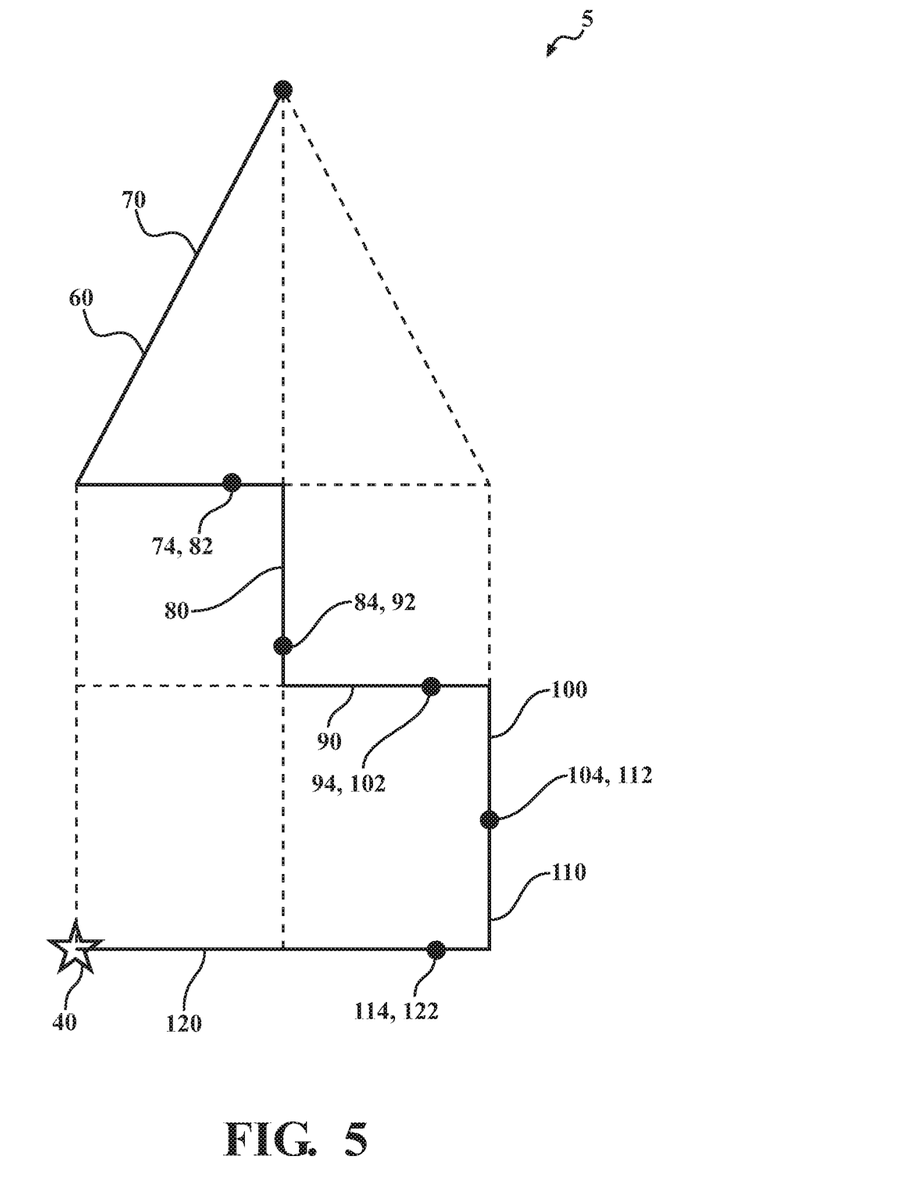
FIG. 5 illustrates the map of FIG. 2 along with the entire route divided into portions and with a corresponding selected cellular tower identified for each of the portions, in accordance with the present disclosure.

FIG. 5 illustrates the map 5 of FIG. 2 along with the route 60 divided into portions, wherein a corresponding selected cellular tower is identified for each of the portions. The map 5 is illustrated including the roadways of FIG. 1, illustrated with dotted lines. The route 60 is illustrated, including a selected subset of the roadways and the destination 40. The route 60 is segmented into a plurality of portions including the first portion 70, the second portion 80, a third portion 90, a fourth portion 100, a fifth portion 110, and a sixth portion 120. The first portion 70 starts at the start point 72 and ends at the end point 74. The second portion 80 starts at the start point 82 and ends at the end point 84. The third portion 90 is segmented from route 60 in a similar process to how the first portion 70 and the second portion 80 were defined, and includes start point 92 and end point 94. The fourth portion 100 is segmented from route 60 in a similar process to how the first portion 70 and the second portion 80 were defined, and includes start point 102 and end point 104. The fifth portion 110 is segmented from route 60 in a similar process to how the first portion 70 and the second portion 80 were defined, and includes start point 112 and end point 114. The sixth portion 120 is segmented from route 60 in a similar process to how the first portion 70 and the second portion 80 were defined, and includes start point 122 and ends at the destination 40.

Figure 6:
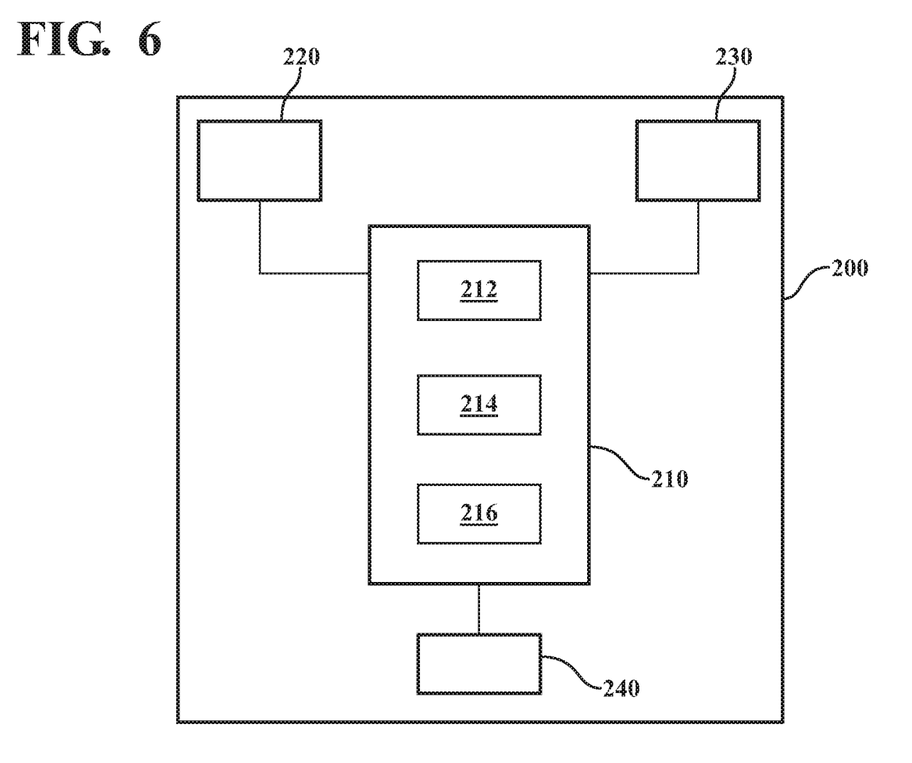
FIG. 6 schematically illustrates an exemplary computerized smart beamform management device for use within a vehicle, in accordance with the present disclosure.

FIG. 6 schematically illustrates an exemplary computerized smart beamform management device 200 for use within the vehicle 10. The computerized smart beamform management device 200 includes a computerized processing device 210, a cellular communications module 220, a user input/output device 230, and a memory storage device 240. It is noted that the computerized smart beamform management device 200 may include other components and some of the components are not present in some embodiments.

The processing device 210 may include memory, e.g., read only memory (ROM) and random-access memory (RAM), storing processor-executable instructions and one or more processors that execute the processor-executable instructions. In embodiments where the processing device 210 includes two or more processors, the processors may operate in a parallel or distributed manner. The processing device 210 may execute the operating system of the smart beamform management device 200. Processing device 210 may include one or more modules executing programmed code or computerized processes or methods including executable steps. Illustrated modules may include a single physical device or functionality spanning multiple physical devices. In the illustrative embodiment, the processing device 210 also includes a route identification module 212, a route segmentation module 214, and a communications management module 216, which are described in greater detail below.

The cellular communications module 220 may include a communications/data connection with a bus device configured to transfer data to different components of the system and may include one or more wireless transceivers for performing wireless communication.

The user input/output device 230 includes hardware and/or software configured to enable the processing device 210 to provide information to and receive inputs from a user, for example, a driver of a vehicle.

The memory storage device 240 is a device that stores data generated or received by the smart beamform management device 200. The memory storage device 240 may include, but is not limited to, a hard disc drive, an optical disc drive, and/or a flash memory drive.

The route identification module 212 may include programming operable to enable the processing device to identify, plan, estimate, or otherwise establish a planned route for the vehicle. The route identification module 212 may receive inputs from the user including a planned destination. The route identification module 212 may determine or provide options to a user regarding roadways to be traveled to reach the destination. Once selected or determined, the roadways to be traveled may be used to define the route.

The route segmentation module 214 may include programming operable to segment the planned route into portions in accordance with the methods described herein. The route segmentation module 214 may access locally or remotely data regarding positions and signal strength of cellular towers near the planned route. The route segmentation module 214 may additionally include programming to evaluate other factors that may influence signal strength and/or communication with the cellular towers.

The communications management module 216 may include programming operable to plan communications along the planned route based upon the portions determined by the route segmentation module 214. The planned communications may include locations and relative positions of the cellular towers, expected signal strengths, and a schedule of communication changes along the planned route. The communications management module 216 may provide all necessary data and computerized instructions to manage cellular communication between the vehicle and cellular towers along the planned route.

The smart beamform management device 200 is provided as an exemplary computerized device capable of executing programmed code to operate the disclosed process. A number of different embodiments of the smart beamform management device 200 and modules operable therein are envisioned, and the disclosure is not intended to be limited to examples provided herein.

Figure 7:
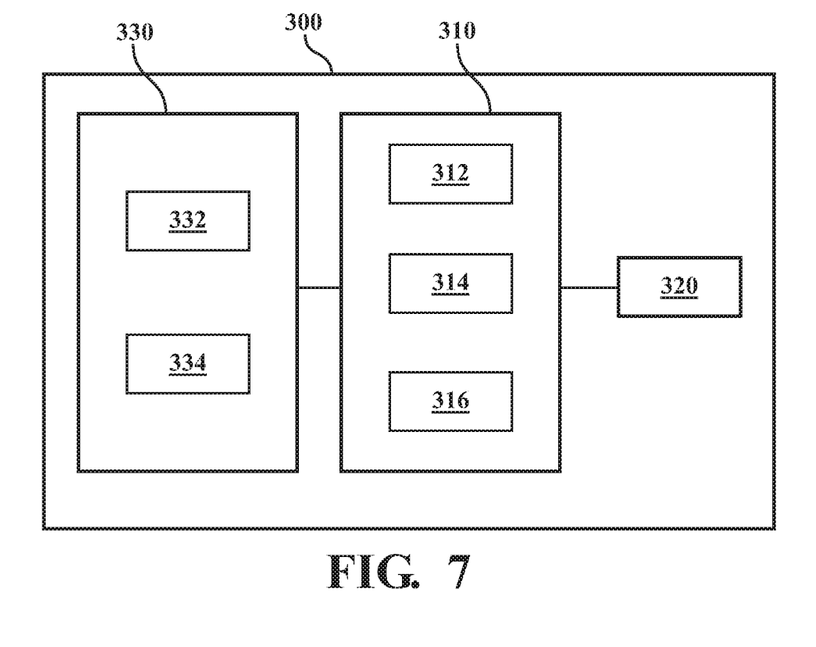
FIG. 7 schematically illustrates an exemplary computerized smart beamform management remote server device, in accordance with the present disclosure.

FIG. 7 schematically illustrates an exemplary computerized smart beamform management remote server device 300. The computerized smart beamform management remote server device 300 may be in communication with the computerized smart beamform management device 200. The computerized smart beamform management remote server device 300 may provide data, computational support, and/or may make determinations in duplicate with the computerized smart beamform management device 200 for purposes of providing back-up to the in-vehicle processes. A number of different ways to divide computerized tasks between the computerized smart beamform management remote server device 300 and the computerized smart beamform management device 200, and the particular tasks and determinations described herein are intended to be non-limiting examples of how the system may work.

The computerized smart beamform management remote server device 300 may be operated and maintained by a corporate entity, such as the manufacturer of the vehicle 10 or a computerized service vendor. The user may be able to subscribe to different, selectable services to manage the disclosed methods. The computerized smart beamform management remote server device 300 includes a computerized processing device 310, a cellular communications module 320, and a memory storage device 330. It is noted that the computerized smart beamform management remote server device 300 may include other components and some of the components are not present in some embodiments.

The processing device 310 may include memory, e.g., read only memory (ROM) and random-access memory (RAM), storing processor-executable instructions and one or more processors that execute the processor-executable instructions. In embodiments where the processing device 310 includes two or more processors, the processors may operate in a parallel or distributed manner. The processing device 310 may execute the operating system of the smart beamform management remote server device 300. Processing device 310 may include one or more modules executing programmed code or computerized processes or methods including executable steps. Illustrated modules may include a single physical device or functionality spanning multiple physical devices. In the illustrative embodiment, the processing device 310 also includes a route estimation module 312, a cellular tower position and signal strength management module 314, and a communications management module 316, which are described in greater detail below.

The cellular communications module 320 may include a communications/data connection with a bus device configured to transfer data to different components of the system and may include one or more wireless transceivers for performing wireless communication.

The memory storage device 330 is a device that stores data generated or received by the smart beamform management remote server device 300. The memory storage device 330 may include, but is not limited to, a hard disc drive, an optical disc drive, and/or a flash memory drive. The memory storage device 330 is illustrated including a vehicle route history database 332, which may include historical data regarding the travel of a user or a vehicle, such that an estimated route may be determined through analysis of the historical data. The memory storage device 330 is further illustrated including a cellular tower database 334 which may include location and/or signal strength data for cellular towers. A number of different databases may be maintained within memory storage device 330, and the disclosure is not intended to be limited to the examples provided herein.

The route estimation module 312 may include programming operable to enable the processing device to estimate a planned route for the vehicle. The route estimation module 312 may utilize an entered destination, time and day of the week, identity of the driver, and other information to estimate the planned route.

The signal strength management module 314 may include programming operable to evaluate signal strength of various cellular towers near the planned route. The signal strength management module 314 may include programming to compare signal strength of a certain cellular tower at various points to a threshold signal strength to determine whether use of the cellular tower at the various points is acceptable. The signal strength management module 314 may evaluate the signal strength of multiple towers simultaneously through a segment of the planned route to determine a schedule for switching between the cellular towers. The signal strength management module 314 may issue an alert message to the user of the vehicle if no cellular tower is determined to provide an acceptably usable signal strength for a segment of the planned route. The signal strength management module 314 may include programming to create a beam matrix, including a list of candidate cellular towers and corresponding signal strengths for each of the candidate cellular towers at locations along the planned route, which may be transmitted once or updated and sent multiple times to the vehicle.

The communications management module 316 may include programming operable to augment and/or duplicate determinations made by communications management module 216 of FIG. 6. In one embodiment, either the communications management module 216 or the communications management module 316 may independently provide all necessary data and computerized instructions to manage cellular communication between the vehicle and cellular towers along the planned route.

The computerized smart beamform management remote server device 300 is provided as an exemplary computerized device capable of executing programmed code to operate the disclosed process. A number of different embodiments of the smart beamform management remote server device 300 and modules operable therein are envisioned, and the disclosure is not intended to be limited to examples provided herein.

Figure 8:
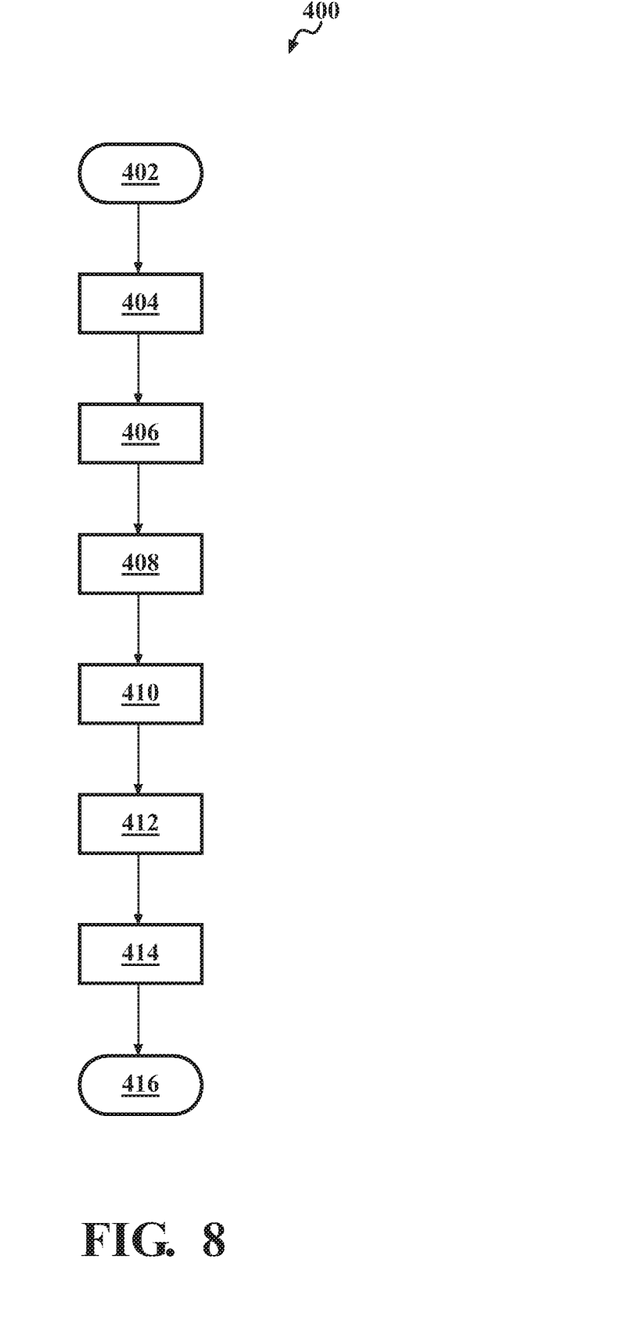
FIG. 8 is a flowchart illustrating an exemplary method for smart beamform management in vehicular communications, in accordance with the present disclosure.

FIG. 8 is a flowchart illustrating an exemplary method 400 for smart beamform management in vehicular communications. The method 400 starts at step 402. At step 404, a planned route is determined. At step 406, a plurality of candidate cellular towers near the planned route are identified. At step 408, signal strengths of each of the candidate cellular towers are determined and tabulated along the planned route. At step 410, the planned route and the tabulated signal strengths of the cellular towers are utilized to segment the planned route into portions, with one of the candidate cellular towers being assigned to each of the portions of the planned route. At step 412, the portions and the assigned cellular towers are coalesced into a communication plan for the vehicle. At step 414, the communication plan is executed as the vehicle travels along the route, with communication between the vehicle and the assigned cellular towers changing according to the communication plan. At step 416, the method 400 ends.

Method 400 is one example of how the disclosed methods and processes may be operated. Additional and/or alternative steps may be utilized. In one exemplary alternative, if the vehicle deviates from the planned route, a new planned route may be formulated, and a new communication plan may be developed in accordance with the present disclosure.

According to methods disclosed herein for beamform management in vehicular communications, within a computerized processor, a method may include determining a planned route for a vehicle and identifying a plurality of candidate cellular towers with which the vehicle may communicate along the planned route. The method may further include determining signal strengths of each of the candidate cellular towers at locations along the planned route and determining a communication plan including segmenting the planned route into a plurality of portions based upon the determined signal strengths. The communication plan includes a list of the candidate cellular towers ranked according to the determined signal strengths for each of the plurality of portions. The method further includes utilizing the communication plan to change communication between the vehicle and the plurality of candidate cellular towers as the vehicle traverses the planned route. This utilizing includes directing the primary lobe of an antenna beam toward each of the candidate cellular towers in turn according to the communication plan.

As the vehicle traverses one of the plurality of portions, the method may include monitoring an interruption in the communication between the vehicle and one of the plurality of candidate cellular towers. This interruption may include, for example, a large concrete and steel structure interfering with the communication signals. The method may include selecting a replacement cellular tower based upon the list of the candidate cellular towers and directing the primary lobe of the antenna beam toward the replacement cellular towers.

The method may further include improving performance of the method and system over time, for example, by tracking occurrences of the interruption in the communication between the vehicle and the one of the plurality of candidate cellular towers. The tracked occurrences may be utilized to modify future iterations of the communication plan to avoid the interruption in the communication between the vehicle and the one of the plurality of candidate cellular towers. Modifying future iterations of the communication plan may include utilizing a machine learning algorithm implementing weighted factors or other modifiers to discourage communication between the vehicle and the one of the plurality of candidate cellular towers.

While the best modes for carrying out the disclosure have been described in detail, those familiar with the art to which this disclosure relates will recognize various alternative designs and embodiments for practicing the disclosure within the scope of the appended claims.

What is claimed is:

1. A method for beamform management in vehicular communications, comprising:
   within a computerized processor,
       determining a planned route for a vehicle;
       identifying a plurality of candidate cellular towers with which the vehicle may communicate along the planned route;
       determining signal strengths of each of the plurality of candidate cellular towers at locations along the planned route;
       determining a communication plan including identifying geographic locations of each of the plurality of candidate cellular towers and segmenting the planned route into a plurality of portions based upon the determined signal strengths, wherein one of the plurality of candidate cellular towers is assigned to communicate with the vehicle for each of the plurality of portions based upon the signal strengths, wherein determining the communication plan includes utilizing a remote server device to create a beam matrix for each of the plurality of portions, the beam matrix including a list of the plurality of candidate cellular towers and the signal strengths of each of the plurality of candidate cellular towers and transmitting the beam matrix to the vehicle;
       monitoring a change to the planned route;
       utilizing the remote server device to create a new beam matrix based upon the change to the planned route; and
       transmitting the new beam matrix to the vehicle; and
       utilizing the communication plan to change a communication between the vehicle and the plurality of candidate cellular towers as the vehicle traverses the planned route, the utilizing including directing a primary lobe of an antenna beam toward each of the candidate cellular towers in turn according to the communication plan.

2. The method of claim 1, wherein directing the primary lobe of the antenna beam toward each of the candidate cellular towers in turn according to the communication plan includes:
   when the vehicle transitions from one of the plurality of portions to a second of the plurality of portions,
       determining a current location of the vehicle,
       determining a current orientation of the vehicle,
       determining an azimuth relative to the vehicle and an elevation relative to the vehicle for the candidate cellular tower assigned to communicate with the vehicle for the second of the plurality of portions based upon the geographic location of the candidate cellular tower assigned to communicate with the vehicle for the second of the plurality of portions, the current location of the vehicle, and the current orientation of the vehicle, and
       directing the primary lobe of the antenna beam toward the candidate cellular tower assigned to communicate with the vehicle for the second of the plurality of portions based on the azimuth relative to the vehicle and the elevation relative to the vehicle for the candidate cellular tower assigned to communicate with the vehicle for the second of the plurality of portions.

3. The method of claim 1, wherein determining the planned route for the vehicle includes monitoring an automated route programmed for the vehicle, wherein the vehicle operates as an autonomous vehicle.

4. The method of claim 1, wherein determining the planned route for the vehicle includes monitoring a user input planned route for the vehicle, wherein the vehicle operates as a manually operated vehicle.

5. The method of claim 1, wherein determining the planned route for the vehicle includes monitoring a user input planned destination for the vehicle and automatically estimating the planned route based upon the user input planned destination.

6. The method of claim 1, further comprising:
   monitoring a detour event that changes the planned route;

determining a new planned route based upon the detour event; and updating the communication plan based upon the new planned route.

7. The method of claim 1, further comprising:

monitoring a plurality of interruptions to the communication between the vehicle and one of the plurality of candidate cellular towers; and utilizing the interruptions to modify future iterations of the communication plan.

8. The method of claim 1, wherein segmenting the planned route into the plurality of portions is further based upon reducing a total number of communication changes over the planned route.

9. A method for beamform management in vehicular communications, comprising:

within a computerized processor,
determining a planned route for a vehicle;
identifying a plurality of candidate cellular towers with which the vehicle may communicate along the planned route;
determining signal strengths of each of the candidate cellular towers at locations along the planned route;
determining a communication plan identifying geographic locations of each of the plurality of candidate cellular towers including segmenting the planned route into a plurality of portions based upon the determined signal strengths, wherein the communication plan includes a list of the candidate cellular towers ranked according to the determined signal strengths for each of the plurality of portions, wherein determining the communication plan includes utilizing a remote server device to create a beam matrix for each of the plurality of portions, the beam matrix including a list of the plurality of candidate cellular towers and the signal strengths of each of the plurality of candidate cellular towers and transmitting the beam matrix to the vehicle;
monitoring a change to the planned route;
utilizing the remote server device to create a new beam matrix based upon the change to the planned route;
transmitting the new beam matrix to the vehicle; and
utilizing the communication plan to change a communication between the vehicle and the plurality of candidate cellular towers as the vehicle traverses the planned route, the utilizing including directing a primary lobe of an antenna beam toward each of the candidate cellular towers in turn according to the communication plan.

10. The method of claim 9, further comprising:

as the vehicle traverses one of the plurality of portions,
monitoring an interruption in the communication between the vehicle and one of the plurality of candidate cellular towers;
selecting a replacement cellular tower based upon the list of the candidate cellular towers; and
directing the primary lobe of the antenna beam toward the replacement cellular tower.

11. The method of claim 10, further comprising:

tracking occurrences of the interruption in the communication between the vehicle and the one of the plurality of candidate cellular towers; and utilizing the tracked occurrences to modify future iterations of the communication plan to avoid the interruption in the communication between the vehicle and the one of the plurality of candidate cellular towers.

12. The method of claim 11, wherein modifying the future iterations of the communication plan includes utilizing a machine learning algorithm to discourage communication between the vehicle and the one of the plurality of candidate cellular towers.

13. A system for beamform management in vehicular communications, comprising:

a vehicle; and
a computerized processor, operable to:
determine a planned route for the vehicle;
identify a plurality of candidate cellular towers with which the vehicle may communicate along the planned route;
determine signal strengths of each of the candidate cellular towers at locations along the planned route;
determine a communication plan including identifying geographic locations of each of the plurality of candidate cellular towers segmenting the planned route into a plurality of portions based upon the determined signal strengths, wherein one of the candidate cellular towers is assigned to communicate with the vehicle for each of the plurality of portions, the determining the communication plan including utilizing a remote server device to create a beam matrix for each of the plurality of portions, the beam matrix including a list of the plurality of candidate cellular towers and the signal strengths of each of the plurality of candidate cellular towers and transmitting the beam matrix to the vehicle;
monitor a change to the planned route;
utilize the remote server device to create a new beam matrix based upon the change to the planned route;
transmit the new beam matrix to the vehicle; and
utilize the communication plan to change communication between the vehicle and the plurality of candidate cellular towers as the vehicle traverses the planned route, wherein utilizing the communication plan includes operability to:
determine a current location of the vehicle,
determine a current orientation of the vehicle,
determine an azimuth relative to the vehicle and an elevation relative to the vehicle for one of the candidate cellular towers along the planned route based upon the current location of the vehicle, the current orientation of the vehicle, and the geographic location of the one of the candidate cellular towers, and
direct a primary lobe of an antenna beam toward the one of the candidate cellular towers based on the azimuth and the elevation for the one of the candidate cellular towers.

14. The system of claim 13, wherein the vehicle includes an autonomous vehicle; and wherein determining the planned route for the vehicle includes monitoring an automated route programmed for the vehicle.

15. The system of claim 13, wherein the computerized processor is further operable to:

monitor a detour event that changes the planned route;
determine a new planned route based upon the detour event; and
update the communication plan based upon the new planned route.

* * * * *